Nov. 9, 1965
R. C. CHAPMAN, JR
3,217,147
CUMULATIVE TYPE DECODER
Filed Nov. 28, 1961
2 Sheets-Sheet 1
FIG. 1
(PRIOR ART)
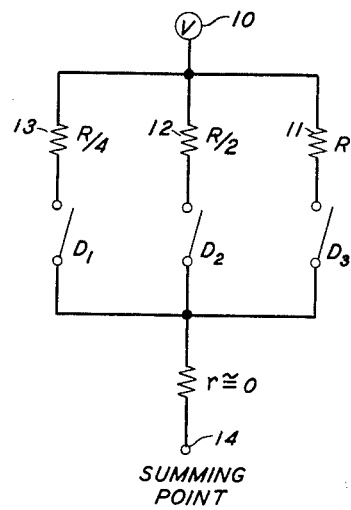
SUMMING POINT
FIG. 2
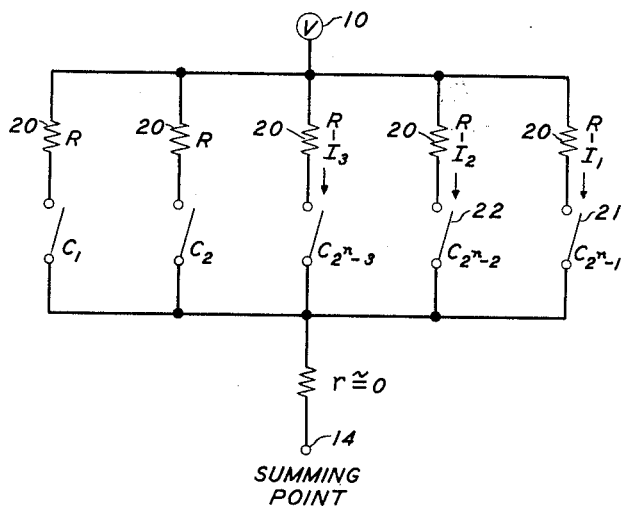
SUMMING POINT
FIG. 3
| $D_1$ | $D_2$ | $D_3$ | --- | $D_{n-1}$ | $D_n$ | $C_1$ | $C_2$ | $C_3$ | --- | $C_{2^n-3}$ | $C_{2^n-2}$ | $C_{2^n-1}$ |
|---|---|---|---|---|---|---|---|---|---|---|---|---|
| 0 | 0 | 0 | --- | 0 | 0 | 0 | 0 | 0 | --- | 0 | 0 | 0 |
| 0 | 0 | 0 | --- | 0 | 1 | 0 | 0 | 0 | --- | 0 | 0 | 1 |
| 0 | 0 | 0 | --- | 1 | 0 | 0 | 0 | 0 | --- | 0 | 1 | 1 |
| 0 | 0 | 0 | --- | 1 | 1 | 0 | 0 | 0 | --- | 1 | 1 | 1 |
| 1 | 1 | 1 | --- | 0 | 1 | 0 | 0 | 1 | --- | 1 | 1 | 1 |
| 1 | 1 | 1 | --- | 1 | 0 | 0 | 1 | 1 | --- | 1 | 1 | 1 |
| 1 | 1 | 1 | --- | 1 | 1 | 1 | 1 | 1 | --- | 1 | 1 | 1 |
INVENTOR
R. C. CHAPMAN, JR.
BY R. B. Ardis
ATTORNEY Nov. 9, 1965                R. C. CHAPMAN, JR                3,217,147
                          CUMULATIVE TYPE DECODER
Filed Nov. 28, 1961                                    2 Sheets-Sheet 2

3 DIGIT CUMULATIVE DECODER

INVENTOR
R. C. CHAPMAN, JR.
BY
ATTORNEY

United States Patent Office 3,217,147
Patented Nov. 9, 1965

3,217,147
CUMULATIVE TYPE DECODER
Roger C. Chapman, Jr., Parsippany, N.J., assignor to Bell Telephone Laboratories, Incorporated, New York, N.Y., a corporation of New York
Filed Nov. 28, 1961, Ser. No. 155,379
6 Claims. (Cl. 235—154)

This invention relates to pulse code communication systems and more particularly relates to decoders for converting a digital signal into its analog representation.

Conventional $n$ digit decoders employ $n$ weighted currents or voltages each controlled by one of the input digits to provide an analog representation of a digital input signal. These decoders, while sufficiently accurate for most purposes, are inherently limited in the accuracy which can be obtained by the very nature of the weighting technique employed. Consider, for example, the binary code three digit decoder shown in block diagram in FIG. 1. Here a common voltage source 10 is employed and the weighting of the currents is obtained by the use of resistors 11, 12, and 13 which are related in binary fashion. Considering resistor 11 to have a resistance R then resistor 12 has a resistance $R/2$ and the resistance of resistor 13 is $R/4$, so that the currents applied to the summing point 14, in response to the digital input signals $D_1$, $D_2$ and $D_3$, are related in binary fashion. The analog number one is produced by the closure of the switch associated with digit $D_3$ and produces a current equal to $V/R$ at the summing point. In a similar manner analog number 2 is represented by a current $$\frac{V}{R/2} = \frac{2V}{R}$$

and the analog number 4 is represented by a current $$V/R/4 \frac{4V}{R}$$

The weighted resistances 11, 12, and 13 are of course not perfect and result in an error in each case so that the current representing analog number 1 may be written $$\frac{V}{R} = a(1 + \Delta_1) = a + a\Delta_1$$

where $a$ is a constant and $\Delta_1$ is the error. Similarly, the second current may be written $$\frac{2V}{R} = 2a(1 + \Delta_2) = 2a + 2a\Delta_2$$

where $\Delta_2$ is the error. Finally the current representing the analog number 4 may be written $$\frac{4V}{R} = 4a(1 + \Delta_3) = 4a + 4a\Delta_3$$

To illustrate how errors are produced consider the difference in total current produced between analog numbers 3 and 4. Analog number 3 consists of the addition of analog numbers 1 and 2 and is $$a + a\Delta_1 + 2a + 2a\Delta_2 = 3a + a\Delta_1 + 2a\Delta_2$$

Analog number 4 is $4a + 4a\Delta_3$ and the difference between the current produced for analog numbers 3 and 4 is $$4a + 4a\Delta_3 - 3a - a\Delta_1 - 2a\Delta_2$$

Since these errors $\Delta_1$, $\Delta_2$, and $\Delta_3$ may be either positive or negative the maximum difference is $$a + a\Delta_1 + 2a\Delta_2 + 4a\Delta_3$$

where $a\Delta_1 + 2a\Delta_2 + 4a\Delta_3$ represents the maximum error.

This error is additive in the sense that the errors $\Delta_1$, $\Delta_2$, and $\Delta_3$ are added together to produce the resulting error. Since this error is both additive and inherent in the design of such decoders the nature of the error results in expensive and complicated apparatus to limit the resulting error. Great efforts have been made in order to make the current sources in conventional decoders (represented by simple resistors 11, 12, and 13 in FIG. 1) extremely accurate. Despite these efforts the basic fact that any errors are additive ($\Delta_1$, $\Delta_2$, $\Delta_3$ are added in the term representing the maximum error) limits the accuracy of this type of decoder, and it is extremely difficult to produce a very accurate decoder employing the above-described weighted current technique.

It is an object of this invention to eliminate the inherent limitations found in weighted current decoders.

It is a related object of this invention to produce an extremely accurate decoder in which the error between decoding levels is not additive.

It is a further object of this invention to reduce the tolerances required in a decoder having a predetermined accuracy.

In accordance with this invention an $n$ digit decoder comprises $2^n - 1$ equal current sources which are switched into a summing point to provide an analog representation of a digital input signal under the control of logic circuitry which is in turn actuated by the digital input signal. This eliminates, as will be shown below, any errors in the system from being inherently additive and produces a decoder of greater accuracy in which the tolerances required in the decoding system are markedly reduced. Because of the manner in which the current sources are switched into the summing point this decoder is called a cumulative type decoder.

This invention will be more fully comprehended from the following detailed description, taken in conjunction with the remaining figures of the drawings, in which:

FIG. 2 is a diagram of a decoder embodying the invention;

FIG. 3 is a logic table illustrating the logic circuitry requirements for operating the current sources shown in FIG. 2;

Figure 4:
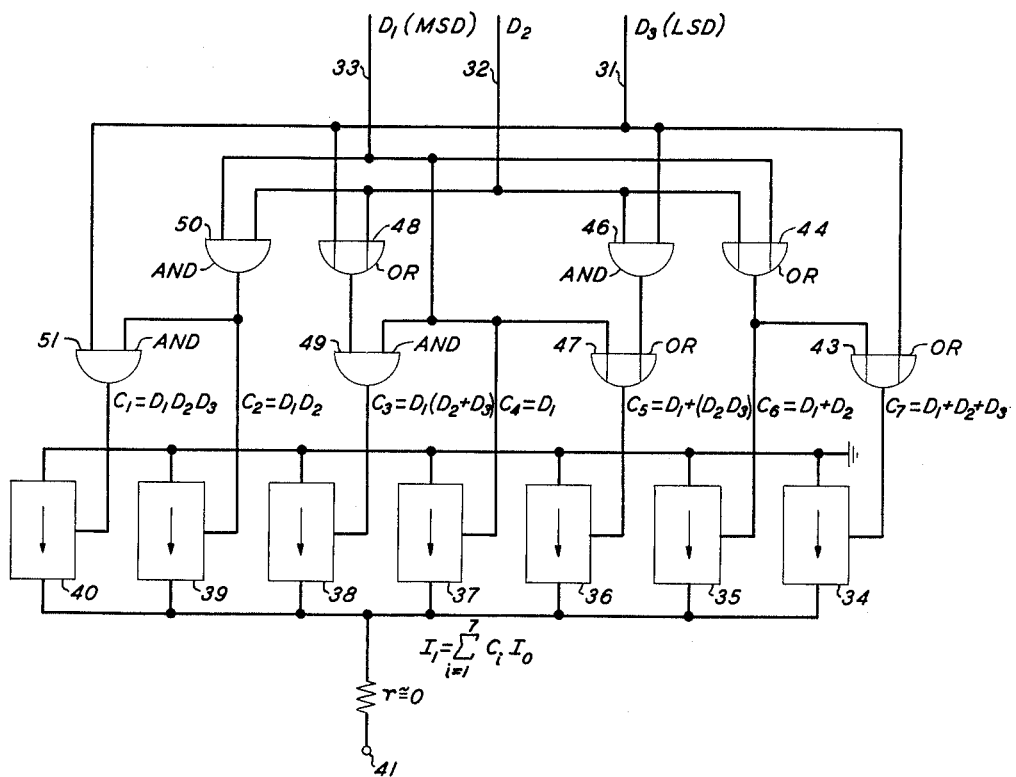
FIG. 4 is a block diagram of a three digit cumulative type decoder embodying the invention.

In accordance with this invention instead of switching weighted currents into a summing point, equal current sources shown in FIG. 2 are switched into the summing point 14 to form an analog representation of the digital input signal. A common voltage source 10 is again employed and a series of resistors 20 are each connected by means of switches to the summing point 14. When the digital input signal represents the number one, then only the switch 21 associated with the first of a number of equal resistances 20, is closed providing a current $I_1$ at the summing point whose analog value is equal to one. Similarly, when the digital input signal represents the number two the switches 21 and 22 close so that the current applied to the summing point has an analog value two. To represent in analog form a digital input signal representing a number $n$, $n$ switches 21, 22 . . . are closed so that the sum of their currents is equal to the number $n$.

To understand why a decoder embodying this invention is more accurate than the decoders of the prior art consider again the difference, for example, between the analog numbers 3 and 4.

Each current $I_1, I_2, I_3 \ldots = V/R = a(1+\Delta)$ where $\Delta$ is different for each current. Thus $$I_1 = a(1+\Delta_1), I_2 = a(1+\Delta_2), I_3 = a(1+\Delta_3) \ldots$$

Analog number 3 is then equal to the sum of $I_1$, $I_2$ and $I_3$ and is $$a(1+\Delta_1) + a(1+\Delta_2) + a(1+\Delta_3)$$

Similarly, analog number 4 is $$a(1+\Delta_1) + a(1+\Delta_2) + a(1+\Delta_3) + a(1+\Delta_4)$$

and the difference between analog numbers 3 and 4 is only $$a(1+\Delta_4)$$

Thus, in a decoder embodying this invention the maximum error between analog numbers 3 and 4 is only $a\Delta_4$ whereas as previously shown it is $a\Delta_1 + 2a\Delta_2 + 4a\Delta_3$ in prior art decoders.

The individual currents $I_1, I_2, I_3, \ldots$ are switched into the summing point under the control of signals derived by logical combinations of the $n$-input digits. The control signals are derived from the digital input signals in accordance with the logic shown in graphic form in FIG. 3. In FIG. 3 the input digits $D_1$ through $D_n$ have the usual binary representation where a "1" represents a pluse and a "0" represents a space. $D_n$ is the least significant digit whose presence alone represents the number 1. $D_{n-1}$ is the next most significant digit whose presence alone represents the number 2. In similar manner $D_{n-2}$ through $D_1$ represent increasingly significant numbers which are related in binary fashion. The meaning of a "1" beneath any control voltage $C_1$ through $C_{2^n-1}$ means that that control voltage is present to cause its related current to flow, e.g., $C_{2^n-1}=1$ means that the control voltage $C_{2^n-1}$ is present and current $I_1$ will flow to the summing point.

A few examples will illustrate how the control signals are derived from the digit signals. Since current $I_1$ should flow whenever any input digit pulse is present then $$C_{2^n-1} = D_1 + D_2 + D_3 + \ldots + D_{n-1} + D_n$$

where the plus sign (+) means "or" in the logic sense. Thus the above equation is interpreted as follows: control pulse $C_{2^n-1}$ is present when digit pulse $D_1$, or digit pulse $D_2$, or digit pulse $D_3$, or digit pulse $\ldots$ or digit pulse $D_n$ is present. Similarly, since the current $I_2$ should flow whenever any input digit pulse $D_1$ through $D_{n-1}$ is present then $$C_{2^n-2} = D_1 + D_2 + D_3 + \ldots + D_{n-1}$$

The third current $I_3$ should flow whenever any input digit pulse $D_1$ through $D_{n-2}$ is present ($D_{n-2}$ representing the binary number four) or when the two least significant digit pulses $D_{n-1}$ and $D_n$ are both present. Thus $$C_{2^n-3} = D_1 + D_2 + \ldots + D_{n-2} + (D_{n-1} \cdot D_n)$$

Thus the above equation may be interpreted as follows: control pulse $C_{2^n-3}$ is present when digit pulse $D_1$ is present, or digit pulse $D_2$ is present, or digit pulse $\ldots$ or digit pulse $D_{n-2}$ is present, or digit pulse $D_{n-1}$ and digit pulse $D_n$ are present where the dot (·) means "and" in the logic sense. Similarly, $C_1$ is present only when all the digit input pulses are present. Thus $$C_1 = D_1 \cdot D_2 \cdot D_3 \cdot \ldots \cdot D_{n-1} \cdot D_n$$

Similarly, $C_2$ may be expressed as present by the following logic $$C_2 = D_1 \cdot D_2 \cdot D_3 \cdot \ldots \cdot D_{n-1}$$

which means that control signal $C_2$ is present only when all the input digit pulses $D_1$ through $D_{n-1}$ are present.

In accordance with this invention the entire code is built up so that only one current source is switched into the summing point between any two adjacent levels. By so doing the percent variation in step size is never more than the percent variation between the current sources.

Thus, for example, where it is required that the maximum step size error in a nine digit decoder be held to within $\pm 10\%$, a cumulative type decoder embodying this invention requires current source tolerances of $\pm 10\%$ whereas a conventional decoder would require current source tolerances of $\pm .02\%$ due to the additive effect of the errors.

In order to make the invention more clearly understood a three digit decoder embodying the invention is shown in FIG. 4. Incoming pulse code signals $D_1$, $D_2$, and $D_3$ appear in parallel form at output terminals 31, 32, 33, respectively. To represent the eight possible output levels seven equal current sources 34 through 40 are provided whose outputs are connected to a summing point 41. Each of these current sources may comprise, for example, a simple voltage source and a resistor. The current sources are activated in accordance with the above-described logic in the following manner.

To represent the number 1 (only $D_3$ the least significant digit pulse is present) source 34 must be switched into the summing point. Terminal 31 is connected to one input of OR gate 43 whose output terminal is connected to source 34 so that when $D_3$ is present source 34 is connected to the summing point.

To represent the binary number 2 (digit pulse $D_2$ alone is present) sources 34 and 35 must be connected to the summing point. Terminal 32 is connected to one input of OR gate 44 whose output activates source 35 and, in addition, activates source 34 through OR gate 43.

To represent the binary number 3 ($D_2$ and $D_3$ present) sources 34, 35 and 36 are activated. Sources 34 and 35 are turned on as above described while source 36 is turned on through the opening of AND gate 46 whose output is applied through OR gate 47 to activate source 36.

Analog number 4 ($D_1$ alone is present) requires the turning on of sources 34 through 37. Terminal 33 is connected to one input of OR gate 44 whose output is applied to OR gate 43 to turn on source 34 and is also applied to source 35 to activate it. Terminal 33 is also applied to OR gate 47 to turn on source 36 and is also directly connected to source 37 to activate it.

Analog number 5 ($D_1$ and $D_3$ present) requires that sources 34 through 38 be turned on. Source 34 is turned on by OR gate 43, source 35 by OR gate 44, source 36 by OR gate 47 and source 37 by direct connection to terminal 33. Terminal 31 is also connected to one input of OR gate 48 whose output is applied to one input of AND gate 49. The second input of AND gate 49 is connected to terminal 33 so that during the presence of $D_1$ and $D_3$ AND gate 49 opens and activates source 38.

Analog number 6 ($D_1$ and $D_2$ present) requires that sources 34 through 39 be turned on. Source 34 is turned on by OR gate 43 which is activated by OR gate 44, source 35 is activated by OR gate 44. Source 36 is turned on by OR gate 47, source 37 is activated by digit pulse $D_1$ on terminal 33, source 38 is turned on by AND gate 49 which is in turn activated by OR gate 48 and the pulse $D_1$ appearing on terminal 33, source 39 is turned on by the output of AND gate 50 whose inputs are connected to terminals 32 and 33.

When all the digit pulses ($D_1$, $D_2$, and $D_3$) are present all the sources 34 through 40 are turned on. Sources 34 through 39 are turned on as described above. In addition, the output of AND gate 50 is applied to one input of AND gate 51 whose second input is connected to terminal 31 so that during the presence of $D_1$, $D_2$, and $D_3$ AND gate 51 turns on source 40.

Figure 5:
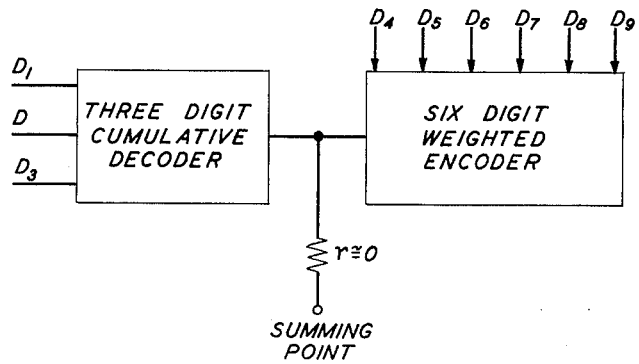
FIG. 5 is a block diagram of a combination cumulative type conventional decoder embodying the invention.

The advantages of the cumulative type decoder become increasingly important as the number of digits is increased. On the other hand, however, the logic circuitry becomes extremely complex as the number of digits increases beyond the simple three or four digit decoder. To provide increased accuracy with a minimum of additional circuitry the cumulative type decoder may be combined in accordance with this invention with the weighted type decoder to provide a decoder in which the cumulative type decoder provides the gross decoder characteristics and the weighted type decoder interpolates between these major points. As an example of such a combination consider the nine digit decoder shown in FIG. 5. The three most significant digits $D_1$, $D_2$, and $D_3$ are decoded by the three digit cumulative type shown in FIG. 4. The remaining six digits are decoded by a conventional weighted six digit decoder which may be, for example, that described in U.S. Patent 2,991,422 issued to R. E. Yaeger on July 4, 1961. The only requirement necessary for combining these decoders is that the weighted current associated with the most significant digit, $D_4$, decoded by the conventional weighted decoder must be one-half the magnitude of the current generated by each of the current sources of the cumulative type decoder. If it is required to keep the maximum step size error to within $\pm 10\%$ the resulting nine digit decoder would only have to have $\pm 0.08\%$ control of the current sources, whereas a conventional weighted nine digit decoder would require current source tolerances of $\pm 0.02\%$. To still further reduce the tolerances required a full nine digit cumulative type decoder could be employed and the resulting current source tolerances would then only be $\pm 10\%$.

One of the real advantages of a cumulative type decoder is the ease with which the decoder characteristics may be changed. As described the decoder has a linear characteristic in that the binary code vs. analog number characteristic is a straight line. By simply changing the currents generated by each of the sources this characteristic may be changed so that it follows any predetermined set of points or any mathematical relationship. The characteristic can, for example, follow a hyperbolic curve.

It is to be understood that the above-described arrangements are merely illustrative of the applications of the invention. Numerous other arrangements may be devised by those skilled in the art without departing from the spirit and scope of the invention.

What is claimed is:

1. In an $n$ digit PCM decoder for transforming a code group of marks and spaces into a signal whose amplitude is an analog representation of said binary code group, a series of $2^n-1$ current sources each of which generates current of the same magnitude, means to connect each of said $2^n-1$ current sources to a common current summing point, and logic circuitry responsive to said code group of marks and spaces to activate said connecting means associated with the number of current sources the sum of whose equal currents is an analog representation of the code group so that the variation between adjacent decoding levels is the current from a single current source.

2. In an $n$ digit PCM decoder for transforming a code group of marks and spaces into a signal whose amplitude is an analog representation of said binary code group, a series of $2^n-1$ current sources each of which generates current of the same magnitude, logic circuitry responsive to said binary code group of marks and spaces to generate control signals, and means responsive to said control signals to connect to a common current summing point the number of current sources the sum of whose equal currents is an analog representation of the code group so that the variation between adjacent decoding levels is the current from a single current source.

3. In an $n$ digit PCM decoder for transforming a code group of marks and spaces into a signal whose amplitude is an analog representation of said binary code, a series of $2^n-1$ current sources each of which generates the same current, logic circuitry responsive to said binary code of marks and spaces to generate control signals $C_1$, $C_2$, $C_3$ ... $C_{2n-3}$, $C_{2n-2}$, $C_{2n-1}$ in response to the input signal digits $D_1$, $D_2$, $D_3$ ... $D_{N-1}$, $D_N$ of said binary code where $D_1$ ... $D_N$ are the binary digits in the order of decreasing significance in accordance with the following logic

| $D_1$ | $D_2$ | $D_3 ... D_{N-1}$ | $D_N$ | $C_1$ | $C_2$ | $C_3 ... C_{2n-3}$ | $C_{2n-2}$ | $C_{2n-1}$ |
|---|---|---|---|---|---|---|---|---|
| 0 | 0 | 0 ... 0 | 0 | 0 | 0 | 0 ... 0 | 0 | 0 |
| 0 | 0 | 0 ... 0 | 1 | 0 | 0 | 0 ... 0 | 0 | 1 |
| 0 | 0 | 0 ... 1 | 0 | 0 | 0 | 0 ... 0 | 1 | 1 |
| 0 | 0 | 0 ... 1 | 1 | 0 | 0 | 0 ... 1 | 1 | 1 |
| | | | | | | | | |
| 1 | 1 | 1 ... 0 | 1 | 0 | 0 | 1 ... 1 | 1 | 1 |
| 1 | 1 | 1 ... 1 | 0 | 0 | 1 | 1 ... 1 | 1 | 1 |
| 1 | 1 | 1 ... 1 | 1 | 1 | 1 | 1 ... 1 | 1 | 1 | where a "0" in the left-hand portion of the logic table indicates a space and a "1" a pulse in accordance with the usual binary notation and a "0" in the right-hand portion of the table indicates the absence of a control pulse and a "1" in the presence of a control pulse, and means responsive to said control signals to connect to a common current summing point the number of current sources the sum of whose equal currents is an analog representation of said binary code so that the variation between adjacent levels is the current from a single current source.

4. In an $n$ digit PCM decoder for transforming a binary code group of marks and spaces into a signal whose amplitude is an analog representation of said binary code group, a series of $m$ weighted current sources responsive to the $m$ least significant digits to provide an analog representation of said $m$ digits at a common summing point, a series of $2^{n-m}-1$ current sources each of which generates the same current, means to connect each of said $2^{n-m}-1$ current sources to a common current summing point, and logic circuitry responsive to the $n-m$ most significant digits to activate said connecting means associated with the number of current sources the sum of whose equal currents is an analog representation of binary code represented by said $n-m$ least significant digits so that the variation between decoding levels represented by said $n-m$ most significant digits is the current from a single current source.

5. A decoder for binary code groups of pulses of at least three digits comprising a plurality of sources of currents of equal magnitude, an output circuit to which currents from said sources are additively supplied, means for connecting a first of said sources to said output circuit when any of said digits is a binary "1," predetermined binary state means for connecting a second of said sources to said output circuit when either the most or the next most significant of said digits is a binary "1," said predetermined binary state means for connecting a third of said sources to said output circuit when either the most significant of said digits is a binary "1" or both of the other of said digits are binary "1's," means for connecting a fourth of said sources to said output circuit when the most significant of said digits is a binary "1," means for connecting a fifth of said sources to said output circuit when the most significant of said digits is a binary "1" and either of the other of said digits is also a binary "1," means for connecting a sixth of said sources to said output circuit when both the most significant and the next most significant of said digits are binary "1's," and means for connecting a seventh of said sources to said output circuit when all three of said digits are binary "1's."

6. A decoder for binary code groups of pulses of at least three digits comprising an input circuit for the pulses representing each of said digits, a plurality of sources of equal currents, an output circuit to which currents from said sources are additively supplied, a first OR gate having two inputs connected respectively to receive the pulses representing the most and the next most significant of said digits, a second OR gate having two inputs connected respectively to receive the pulses representative of the least significant of said digits and the other to receive the output of said first OR gate, a circuit for controlling the connection of a first of said sources to said output circuit responsive to the output of said second OR gate, a circuit for controlling the connection of a second of said sources to said output circuit responsive to the output of said first OR gate, a first AND gate having two inputs connected respectively to receive the pulses representative of the least significant and the next most significant of said digits, a third OR gate having two inputs, one connected respectively to receive the output of said first AND gate and the other to receive the pulse representative of most significant of said digits, a circuit for controlling the connection of a third of said sources to said output circuit responsive to the output of said third OR gate, a circuit for controlling the connection of a fourth of said sources to said output circuit and directly responsive to the pulse representative of the most significant of said digits, a fourth OR gate having two inputs connected respectively to receive the pulses representative of the most significant and the second most significant of said digits, a second AND gate having two inputs connected respectively to receive the pulse representative of the most significant of said digits and the output of said fourth OR gate, a circuit for controlling the connection of a fifth of said sources to said output circuit responsive to the output of said second AND gate, a third AND gate having two inputs connected respectively to receive the pulses representative of the most significant and the second least significant of said digits, a circuit for controlling the connection of said sixth of said sources to said output circuit responsive to the output of said third AND gate, a fourth AND gate having two inputs connected to receive respectively the pulse representative of the most significant of said digits and the output of said third AND gate, and a circuit for controlling the connection of a seventh of said sources to said output circuit responsive to the output of said fourth AND gate.

References Cited by the Examiner
UNITED STATES PATENTS

| | | | |
|---|---|---|---|
| 2,458,030 | 1/49 | Rea | 340—347.1 |
| 2,986,727 | 5/61 | Macklem | 340—347.1 |
| 2,994,862 | 8/61 | Preston | 340—347 |
| 3,066,287 | 11/62 | Matarese | 340—347 |

MALCOLM A. MORRISON, *Primary Examiner.*

WALTER W. BURNS, Jr., *Examiner.*